(12) United States Patent
Hayashi

(10) Patent No.: US 6,379,158 B1
(45) Date of Patent: *Apr. 30, 2002

(54) STEERING UNIT-MOUNTING STRUCTURE

(75) Inventor: Hiroyuki Hayashi, Nagoya (JP)

(73) Assignees: Harness System Technologies Research, Ltd., Nagoya; Sumitomo Wiring Systems, Ltd., Mie; Sumitomo Electric Industries, Ltd., Osaka, all of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/387,849

(22) Filed: Sep. 1, 1999

(30) Foreign Application Priority Data

Dec. 4, 1998 (JP) ............................................. 10-346132

(51) Int. Cl.[7] .......................... H01R 33/00; H01R 13/15; H01R 11/22; H01R 13/62
(52) U.S. Cl. ........................... 439/34; 439/264; 439/310
(58) Field of Search ........................... 439/34, 264, 310

(56) References Cited

U.S. PATENT DOCUMENTS

| | | | | |
|---|---|---|---|---|
| 5,788,522 A | * | 8/1998 | Kameyama | 439/248 |
| 5,919,055 A | * | 7/1999 | Hattori | 439/310 |
| 5,944,534 A | * | 8/1999 | Hoffmann et al. | 439/15 |
| 5,975,933 A | * | 11/1999 | Yamaguchi et al. | 439/247 |
| 6,000,949 A | * | 12/1999 | Takiguchi et al. | 439/34 |

* cited by examiner

Primary Examiner—P. Austin Bradley
Assistant Examiner—Edwin A. León
(74) Attorney, Agent, or Firm—Oliff & Berridge (57) ABSTRACT

Second connectors 61x are fixed symmetrically with respect to a steering shaft 10 on a steering post 20 in such a manner that these second connectors are slightly movable, and a steering unit 30 is moved parallel to the axis of the steering shaft 10, thereby connecting two first connectors 62x, fixedly mounted on the steering unit 30, to the second connectors 61x, respectively. Lever-type connectors, having the function of reducing a load exerted during the connecting operation, are used as the first and second connectors 62x and 61x, respectively.

5 Claims, 6 Drawing Sheets

STEERING UNIT-MOUNTING STRUCTURE

BACKGROUND OF THE INVENTION

1. Field of the Invention

This invention relates to a steering unit-mounting structure for mounting a steering unit (switch box), having combination switches (provided in the vicinity of a steering wheel of an automobile) for turning signal lamps, wipers, headlights and so on, on a steering post.

2. Description of the Related Art

Figure 5:
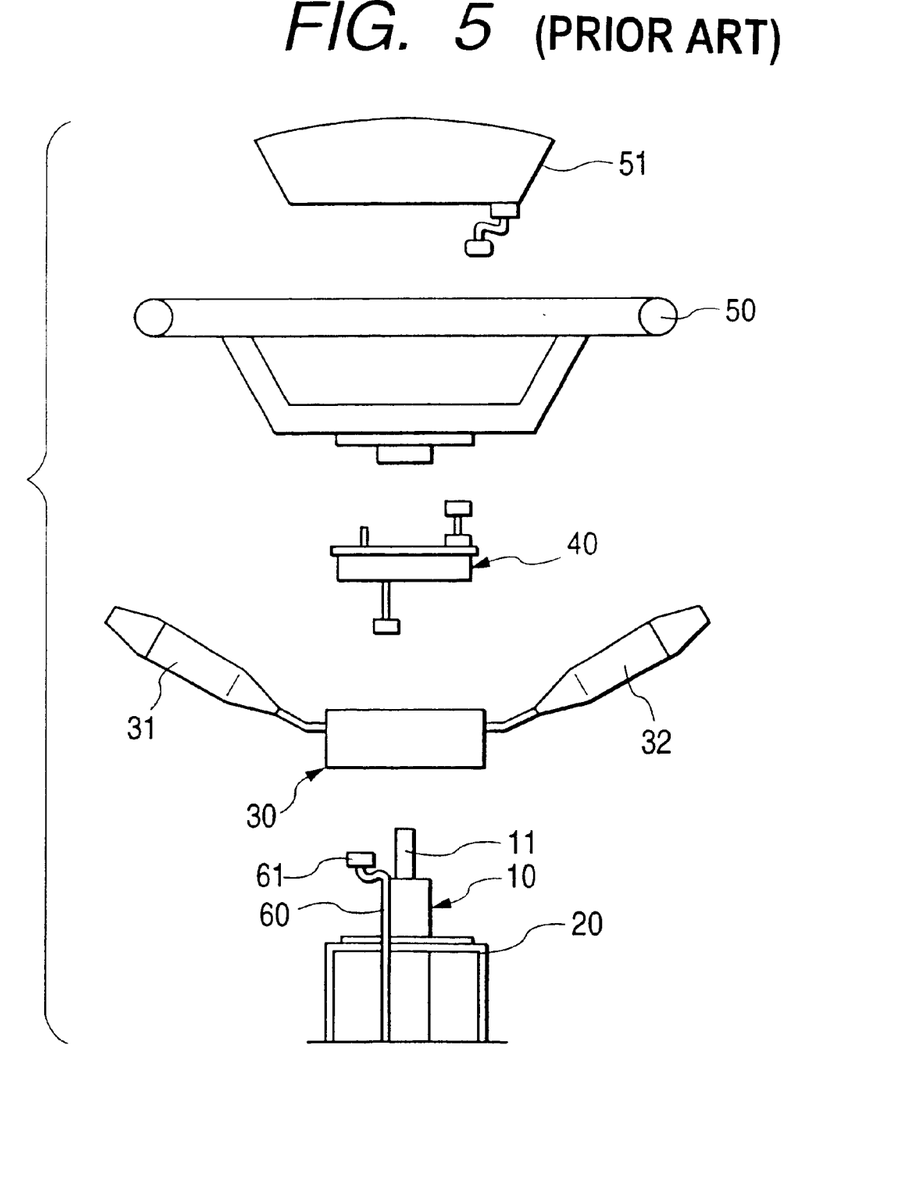
FIG. 5 is an exploded, side-elevational view of a steering wheel-mounting portion of an automobile.

FIG. 5 shows a steering wheel mounting portion of an ordinary construction in an automobile. A steering shaft 10 is rotatably supported on a steering post 20. A steering unit 30 and a rotary connector (rotary connection device) 40 are mounted on that portion of the steering post 20 disposed in a car room. A steering wheel 50 is mounted on a distal end portion 11 of the steering shaft 10, extending through the steering unit 30 and the rotary connector 40, so as to rotate with the steering shaft 10. An electric equipment 51, such as a horn switch and an air bag, is mounted on the steering wheel 50. Combination switches for turning signal lamps, wipers and so on, are incorporated in the steering unit 30, and operating levers 31 and 32 for effecting the switching operation of these switches are mounted on left and right side surfaces of the steering unit 30, respectively. A wire harness 60 for connecting a control circuit on a vehicle body to the electric equipment 51 on the steering wheel 50 and the combination switches in the steering unit 30 is arranged to extend along the steering post 10, and for example, female connectors 61 are fixedly secured to a distal end of this wire harness.

Figure 6:
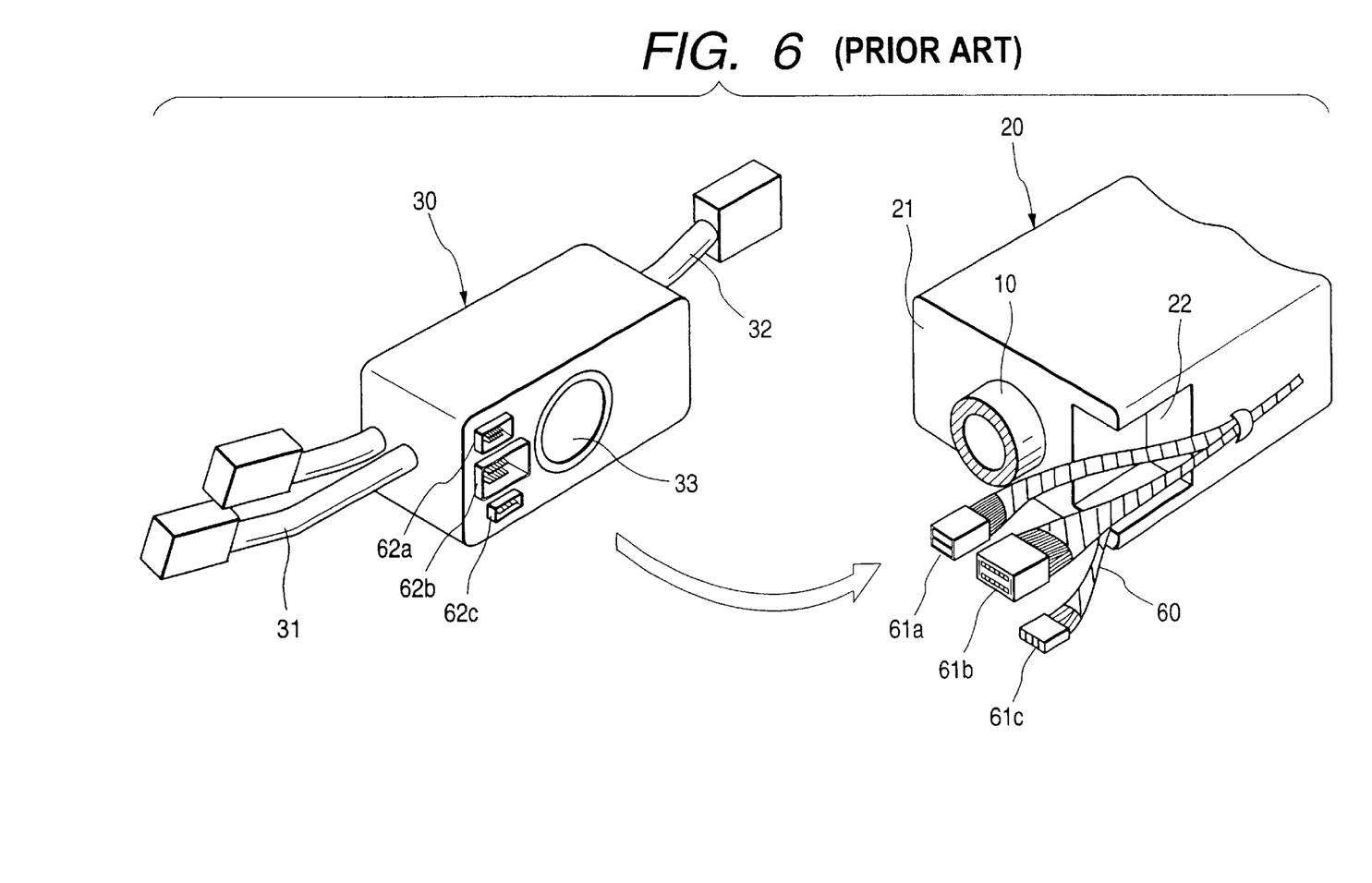
FIG. 6 is a perspective view showing a conventional steering unit-mounting structure.

FIG. 6 shows a conventional mounting structure for mounting the steering unit 30 on the steering post 10. The distal end of the wire harness 60 projects slightly beyond a distal end 21 of the steering post 20. The distal end of the wire harness 60 is divided into a plurality of sections, and the female connectors 61a to 61c are fixedly secured to these sections, respectively. A recess 22 for receiving the projected portion of the wire harness 60 after the connection of the connectors is formed in the steering post 20 in adjacent relation to a distal end 21 thereof. A through hole 33 for fitting on the steering shaft 10, projecting from the steering post 20, is formed through the steering unit 30, and male connectors 62a to 62c for connection respectively to the female connectors 61a to 61c are fixedly mounted on the steering unit 30.

Generally, in connectors, male terminals are press-fitted respectively into female terminals, thereby making an electrical connection therebetween. Therefore, the number of pins in the connector, which can be manually connected, is limited. Therefore, as shown in FIG. 6, the distal end of the wire harness is divided into a plurality of sections, and the connection must be made using the plurality of connectors 61a to 61c and 62a to 62c.

For mounting the steering unit 30 on the steering post 20, the operator first holds the steering unit 30 with one hand, and in this condition the male connectors 62a to 62c are connected to the female connectors 61a to 61c, respectively. Then, that portion of the wire harness 60, projecting from the distal end 21 of the steering post 20, and the female connectors 61a to 61c are pushed into the recess 22 in the steering post 20, and in this condition the steering shaft 10 is passed through the through hole 33 in the steering unit 30. Then, the steering unit 30 and the steering post 20 are positioned relative to each other, and thereafter the steering unit 30 is fixed to the steering post 20 by bolts or the like (not shown).

In the above conventional steering unit-mounting structure, however, the female connectors 61a to 61c, associated with the steering post 20, must be manually connected respectively to the male connectors 62a to 62c on the steering unit 30, and this operation must be carried out in the narrow cockpit of the automobile, and therefore the mounting operation is very difficult. In FIG. 6, although the wire harness 60 and the connectors 61a to 61c and 62a to 62c are arranged on one side of the steering shaft 10, such wire harness 60 and connectors 61a to 61c and 62a to 62c must be arranged on each side of the steering shaft 10 if the number of circuits increases. In this case, the number of the connectors increases, which leads to high possibilities of a connection error, a connection omission and incomplete connection.

And besides, the plurality of connectors 61a to 61c must be connected respectively to the plurality of connectors 62a to 62c while holding the steering unit 30 with one hand, and therefore the efficiency of the operation is low. Furthermore, when pushing that portion of the wire harness 60, projecting from the distal end 21 of the steering post 20, into the recess 21 in the steering post 20, the elasticity of the wire harness provides a load, and therefore the steering unit 30 must be pressed against the steering post 20, and this further worsens the operation efficiency.

Furthermore, when that portion of the wire harness 60, projecting from the steering post 20, is pushed into the recess, this portion is deformed, and if this deformed portion is held between the steering unit 30 and the steering post 20, the steering unit 30 can not be fixed to the steering post 20, and therefore the operation must be again carried out from the beginning. Alternatively, if the steering unit 30 is forcibly fixed to the steering post 20, a sheath of the wire harness 60, held between the steering unit 30 and the steering post 20, is broken, which causes an insulation failure.

SUMMARY OF THE INVENTION

This invention has been made in order to solve the above problems of the conventional structure, and an object of the invention is to provide a steering unit-mounting structure in which connectors on a steering unit can be easily and positively connected respectively to connectors associated with a steering post, and besides the steering unit can be quite easily mounted on the steering post.

The above object has been achieved by a steering unit-mounting structure of the present invention wherein a steering unit, including at least a combination switch and a first connector connected to the combination switch, is mounted on a steering post simultaneously when the steering unit is connected to a second connector fixed to the steering post, comprising: when the steering unit is to be mounted on the steering post, the second connector is beforehand fixed in such a position that the second connector is opposed to the first connector on the steering unit, and is connectable to the first connector; and the steering unit is positioned and provisionally fixed relative to the steering post by connecting the first connector to the second connector.

In the above construction, the second connector may be slightly movable in upward, downward, right and left directions.

A pair of the first connectors, as well as a pair of the second connectors, may be arranged symmetrically with respect to a steering shaft extending through the steering post.

Lever-type connectors may be used as the first and second connectors, respectively, and one of the connectors has a rotary lever having an engagement portion, and a boss for engagement with the engagement portion of the rotary lever is formed on the other connector.

A male thread may be provided at the first connector, and a female thread for being threaded on the male thread may be provided at the second connector.

The present disclosure relates to the subject matter contained in Japanese patent application No. Hei. 10-346132 (filed on Dec. 4, 1998) which is expressly incorporated herein by reference in its entirely.

DETAILED DESCRIPTION OF THE PREFERRED EMBODIMENTS (First Embodiment)

Figure 1:
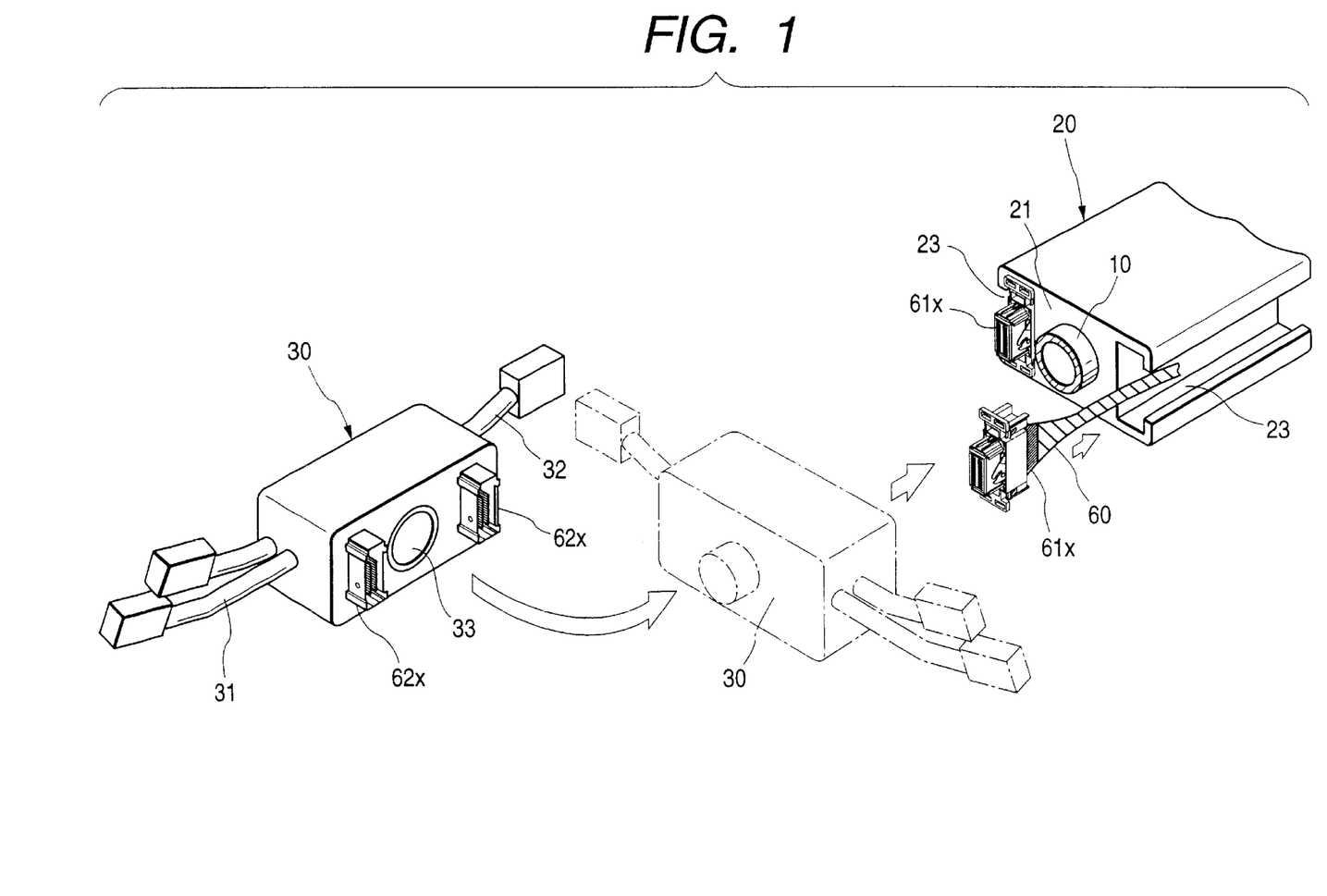
FIG. 1 is a perspective view showing a first embodiment of a steering unit-mounting structure of the present invention.

A first embodiment of a steering unit-mounting structure of the present invention will now be described. FIG. 1 shows the steering unit-mounting structure of the first embodiment. Second connectors 61x, associated with a steering post 20, are fixedly secured respectively to distal ends of wire harnesses 60. Two recesses 23 for respectively fixedly receiving the second connectors 61x are formed in the steering post 20 in adjacent relation to a distal end 21 thereof, and these recesses 23 are disposed symmetrically with respect to a steering shaft 10. The pair of wire harnesses 60, as well as the pair of second connectors 61x, are also disposed symmetrically with respect to the steering shaft 10. A through hole 33 for fitting on the steering shaft 10, projecting from the steering post 20, is formed through a steering unit 30, and first connectors 62x for connection respectively to the second connectors 61x are fixedly mounted on the steering unit 30, and are disposed symmetrically with respect to the through hole 33.

Figure 2A:
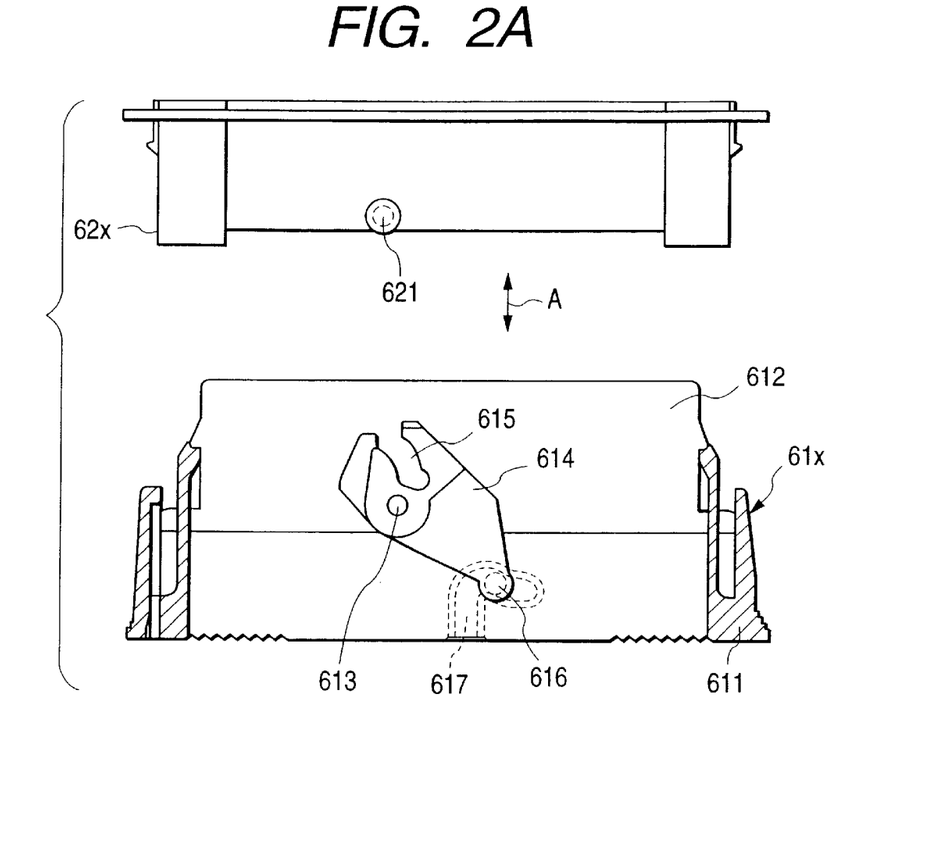
FIG. 2A and FIG. 2B are views showing the construction of first and second connectors, used in the first embodiment, and a connecting operation.
Figure 2B:
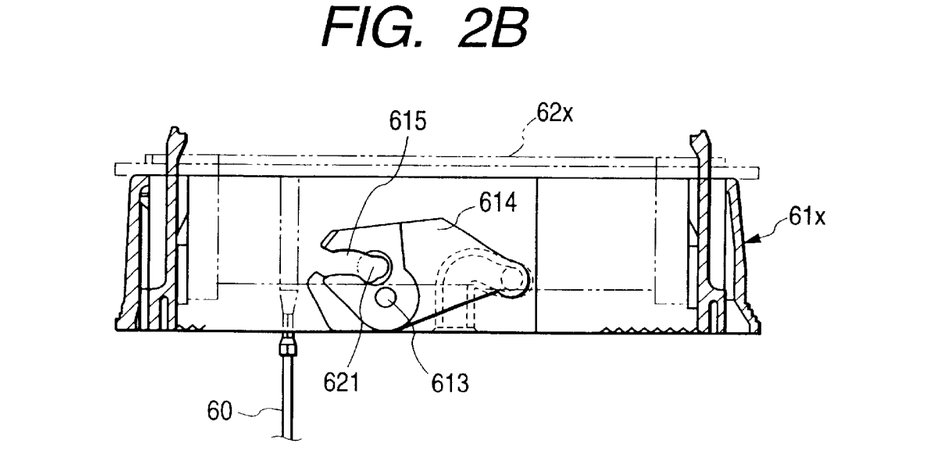
Figure 3:
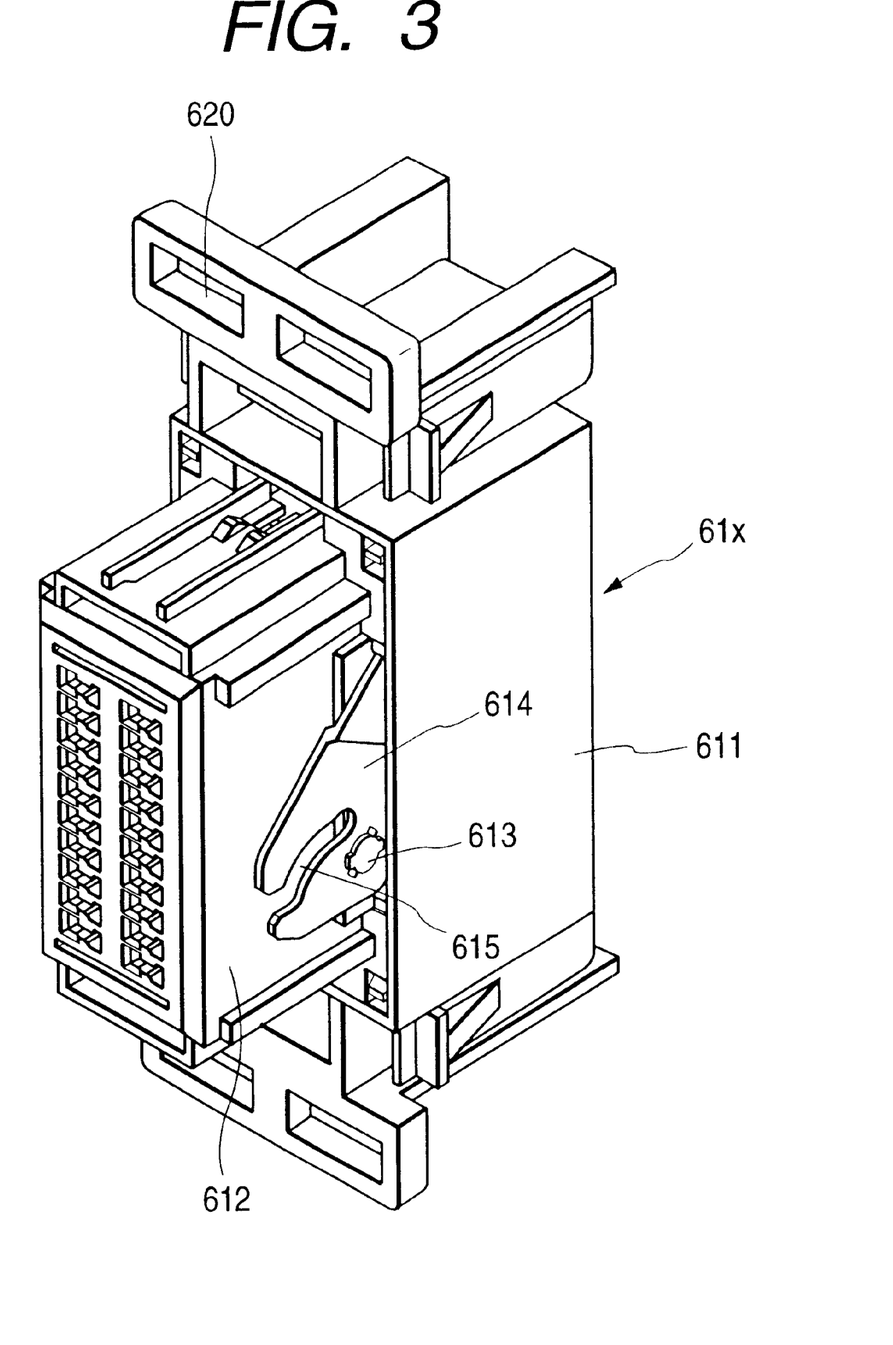
FIG. 3 is a perspective view showing the appearance of the second connector used in the first embodiment.

The constructions of the first and second connectors 62x and 61x, used in the first embodiment, as well as the connecting operation thereof, are shown in FIG. 2. FIG. 2(a) shows a condition in which the first and second connectors 62x and 61x are not yet connected together, and FIG. 2(b) shows a condition in which the first and second connectors 62x and 61x are connected together. FIG. 3 shows the appearance of the second connector 61x.

For example, the first connector 62x is a male connector while the second connector 61x is a female connector. Male terminals, connected respectively to wires extending from combination switches in the steering unit 30, are arranged within the first connector 62x. The first connector 62x has no moving portion.

The second connector 61x comprises a fixing portion 611 to be fixed to the recess 23, and a moving portion 612 slidable relative to the fixing portion 611 in a direction of arrow A as shown in FIG. 2(a). A rotary lever 614, rotatable about a shaft 613, is mounted on the moving portion 612. The rotary lever 614 has an engagement groove 615 for engagement with a boss 621 formed on the first connector 62x, and also has a boss 616 engaged in a guide groove 617 formed in the fixing portion 611.

As described above, in connectors, male terminals are press-fitted respectively into female terminals, thereby making an electrical connection therebetween. Therefore, if the number of pins in the connector is large, a very large force is required for connecting the first connector 62x and the second connector 61x together. On the other hand, it is difficult to move the first connector 62x parallel relative to the second connector 61x. Therefore, when trying to forcibly connect the connectors together with a large force, there is a possibility that the first connector 62x is inclined relative to the second connector 61x, so that the male terminals or the female terminals may be damaged. However, the rotary lever 614 and the boss 621 serve as a mechanism for reducing a load exerted when connecting the connectors together, as described later, and therefore the first connector 62x can be connected to the second connector 61x with a relatively small force, and also the first connector 62x can be move parallel relative to the second connector 61x, and therefore the male terminals and the female terminals will not be damaged. The reason for this will be described below.

In the process of connecting the first connector 62x to the second connector 61x, the male terminals in the first connector 62x are brought into contact with the respective female terminals in the second connector 61x, and the male terminals are half inserted or fitted in the respective female terminals. At this time, the boss 621 on the first connector 62x is engaged in the engagement groove 615 formed in the rotary lever 614 mounted on the moving portion 612 of the second connector 61x. When the first connector 62x is further pushed into the second connector 62x, the moving portion 612 of the second connector 61x is moved together with the first connector 62x, and in accordance with this movement, the rotary lever 614 rotates about the shaft 613. As a result of rotation of the rotary lever 614, the boss 621 on the first connector 62x slides along the engagement groove 615 in the rotary lever 614, and also the boss 616 of the rotary lever 614 slides along the guide groove 617. At this time, the male terminals in the first connector 62x are not yet completely fitted respectively in the female terminals in the second connector 61x. The boss 621 on the first connector 62x and the engagement portion 615 in the rotary lever 614 follow the movement of the first connector 62x and the moving portion 612 of the second connector 61x, or the boss 621 is pressed against an end surface of the engagement portion 615.

When the first connector 62x is further pushed into the second connector 61x, the boss 616 of the rotary lever 614 reaches an inner end of the guide groove 617 in the fixing portion 611, and can not move any longer. In this condition, when the first connector 62x is further pushed into the second connector 61x, the end surface of the engagement portion 615 in the rotary lever 614 pushes the boss 621 of the first connector 62x toward the second connector 61x, so that the rotary lever 614 functions to draw the first connector 62x toward the second connector 61x. Namely, a force, larger than the force actually applied to the first connector 62x, acts on the first connector 62x and the second connector 61x, and the male terminals in the first connector 62x are press-fitted respectively into the female terminals in the second connector 61x. Therefore, the first connector 62x and the second connector 61x can be connected together with the relatively small force.

Thus, the lever-type connectors are used as the first connector 62x and the second connector 61x, and therefore the first connector 62x and the second connector 61x can be connected together with the relatively small force through the rotary lever 614 even if the number of pins in the connector is so large that the load, exerted during the connecting operation, is large. The steering unit 30 is properly positioned relative to the steering post 20 simultaneously when the first connectors 62x are connected to the second connectors 61x, respectively. After this positioning is effected, the steering unit 30 is fixedly secured to the steering post 20 by bolts or the like, thus completing the mounting of the steering unit 30.

An error in the positioning of the first and second connectors 62x and 61x relative to each other, as well as an error in the positioning of these connectors relative to the steering shaft 10, can not be reduced to zero, and therefore it is preferred that each of the second connectors 61x, associated with the steering post 20, should be movable slightly in upward, downward, right and left directions. Specifically, holes 620, through which mounting screws pass, respectively, are formed into a rectangular shape, a generally-oval shape or other suitable shape.

(Second Embodiment)

Figure 4:
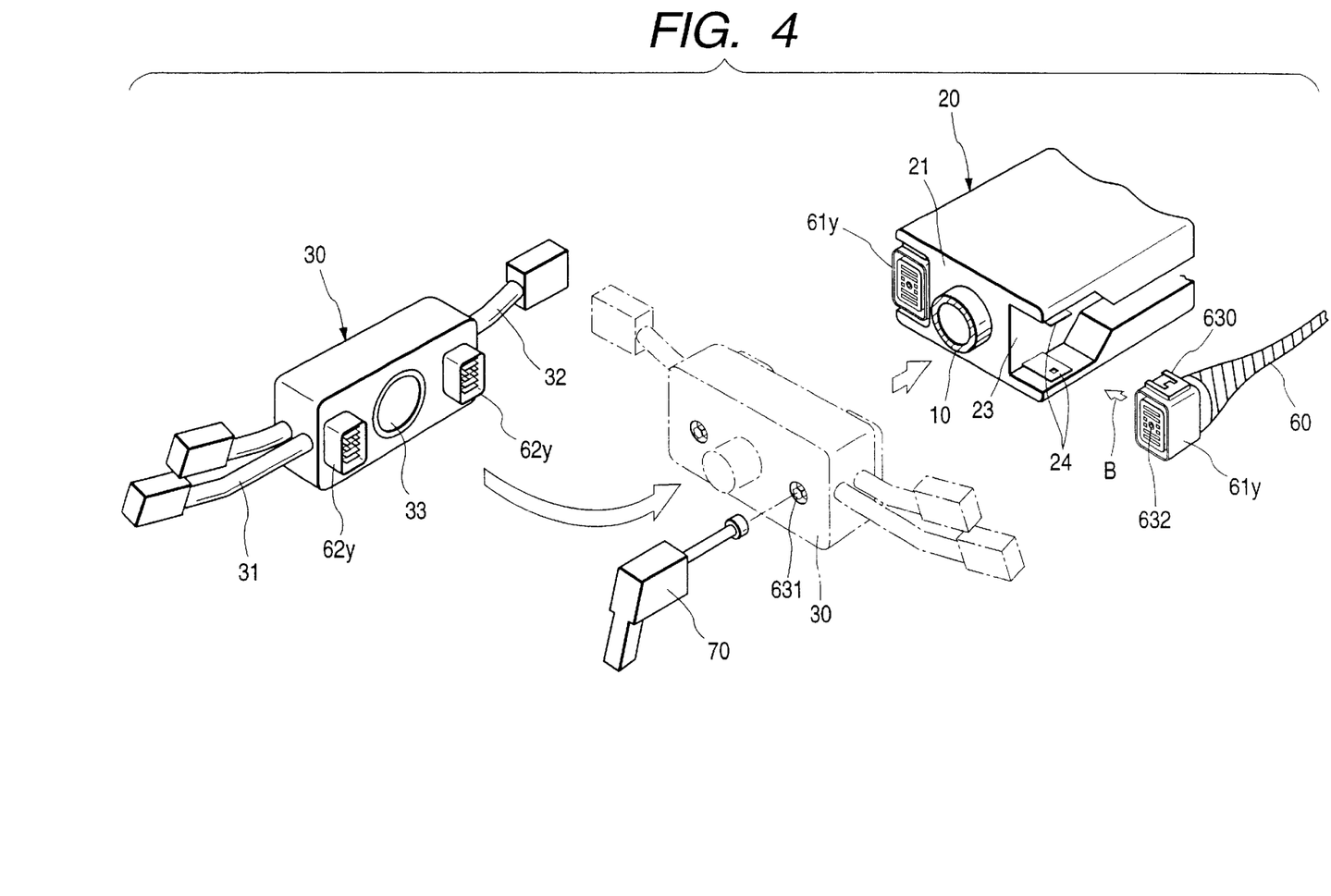
FIG. 4 is a perspective view showing a second embodiment of a steering unit-mounting structure of the invention.

Next, a second embodiment of a steering unit-mounting structure of the present invention will be described. FIG. 4 shows the steering unit-mounting structure of the second embodiment. In the second embodiment, second connectors 61y, associated with a steering post 20, are fixedly secured respectively to distal ends of wire harnesses 60 as described above for the first embodiment. Two recesses 23 for respectively fixedly receiving the second connectors 61y are formed in the steering post 20 in adjacent relation to a distal end 21 thereof, and these recesses 23 are disposed symmetrically with respect to a steering shaft 10. The pair of wire harnesses 60, as well as the pair of second connectors 61y, are also disposed symmetrically with respect to the steering shaft 10. A through hole 33 for fitting on the steering shaft 10, projecting from the steering post 20, is formed through a steering unit 30, and first connectors 62y for connection respectively to the second connectors 61y are fixedly mounted on the steering unit 30, and are disposed symmetrically with respect to the through hole 33.

Two tongues 24, projecting in a cantilever manner, are provided in each of the recesses 23 in the steering post 20. Two mounting seats 630, each having grooves for engagement with the associated tongue 24, are formed on upper and lower surfaces of the second connector 61y, respectively. Therefore, each second connector 61y can be attached to the steering post 20 from the side thereof (as indicated by arrow B) by engaging the mounting seats 630 with the respective tongues 24. There may be adopted an arrangement in which the width of the grooves in the mounting seat 630 is larger than the thickness of the tongue 24, and a leaf spring or the like is provided in the groove so that the tongue 24 can be slightly moved in the groove in upward, downward, right and left directions.

A male thread 631 is rotatably provided at a generally central portion of each first connector 62y in such a manner that the male thread 631 can not be disengaged from the first connector 62y. A female thread 632 for being threaded on the male thread 631 in the first connector 62y is provided at a generally central portion of the second connector 61y. A head of the male thread 631 in each first connector 62y is exposed to an outer surface of the steering unit 30, and the male thread can be rotated by an electrically-operated screwdriver 70 or the like.

In the second embodiment, the thread-coupling connectors are used as the first and second connectors 62y and 61y, respectively, and therefore for connecting the two connectors together, a large force is not applied at a time, but the male thread 631 is continuously rotated with a relatively small force, and the first connector 62y is gradually fitted on the second connector 61y in accordance with the rotation of the thread, and finally the first connector 62y and the second connector 61y are connected together. Therefore, the two connectors can be connected together with the relatively small force even if the number of pins in the connector is so large that the load, exerted during the connecting operation, is large. And besides, since the electrically-operated screwdriver 70 is used, the burden on the operator is reduced. The first and second connectors 62y and 62x are fixed to each other by the threads simultaneously when they are connected together, and therefore at the same time, the steering unit 30 is properly positioned relative to the steering post 20. The threads in the first and second connectors 62y and 62x are smaller in size than the steering unit 30, and therefore the steering unit 30 may be fixedly secured to the steering post 20 by bolts or the like of a larger size.

In the above embodiments, the wire harnesses 60 are disposed respectively on the opposite sides of the steering shaft 10, and are arranged symmetrically with respect to the steering shaft 10, and similarly, the first connectors 62x, 62y, as well as the second connectors 61x, 61y, are arranged symmetrically with respect to the steering shaft 10. However, the present invention is not limited to such an arrangement, and the wire harness, the first connector and the second connector may be disposed on one side of the steering shaft. The connectors are not limited to the lever-type and the thread coupling-type, and may be of any other suitable type having the function of reducing the load exerted during the connecting operation. If the number of pins in the connector is so small that the load, exerted during the connecting operation, is small, connectors of the ordinary type as used in the above conventional construction, may be used.

As described above, the present invention provides the steering unit-mounting structure wherein the steering unit, including at least the combination switch and the first connector connected to the combination switch, is mounted on the steering post simultaneously when the steering unit is connected to the second connector fixed to the steering post, comprising: when the steering unit is to be mounted on the steering post, the second connector is beforehand fixed in such a position that the second connector is opposed to the first connector on the steering unit, and is connectable to the first connector; and the steering unit is positioned and provisionally fixed relative to the steering post by connecting the first connector to the second connector. Therefore, the first and second connectors function as positioning jigs and provisionally-fixing jigs, and the steering unit is provisionally fixed to the steering post simultaneously when the connectors are connected together, and therefore the steering unit-mounting operation is simplified. The second connector, associated with the steering post, is beforehand fixed, and therefore it is not necessary to push the wire harness relative to the steering post, and the load, exerted during the mounting of the steering unit, is reduced, and also there is eliminated a possibility that the wire harness is held between the steering unit and the steering post, thereby preventing troubles such as an insulation failure.

The second connector is slightly movable in upward, downward, right and left directions, and with this construction an error in the positioning of the first connector, mounted on the steering unit, relative to the second connector, associated with the steering post, can be absorbed.

The first connectors, as well as the second connectors, are arranged symmetrically with respect to the steering shaft extending through the steering post, and with this construction the balance in the right-left direction can be made good when mounting the steering unit.

Lever-type connectors may be used as the first and second connectors, respectively, and one of the connectors has the rotary lever having the engagement portion, and the boss for engagement with the engagement portion of the rotary lever is formed on the other connector. With this construction, the first and second connectors can be connected together with a relatively small force even if the number of pins in the connector is so large that the load, exerted during the connecting operation, is large.

The male thread is provided at the first connector, and the female thread for being threaded on the male thread is provided at the second connector. With this construction, even if the number of pins in the connector is so large that the load, exerted during the connecting operation, is large, the first and second connectors can be connected together with a relatively small force by gradually threading the male thread into the female thread. And besides, the electrically-operated screwdriver can be used, and the burden on the operator can be reduced. Furthermore, the connected condition of the first and second connectors is locked by the threaded connection, so that the two will not be easily disengaged from each other, and therefore the provisionally-fixed condition of the steering unit and the steering post can be locked simultaneously when the first and second connectors are connected together.

What is claimed is:

1. A steering unit-mounting apparatus comprising:
a steering unit having a combination switch and a first plurality of connectors connected to the combination switch; and
a steering post having a steering shaft and a second plurality of connectors fixable thereon and symmetrically located about said steering shaft, said second connectors being engagable with said first connectors in a connected position,
wherein said steering unit is mountable on said steering post in a provisionally aligned and mounted position by aligning and opposing said first connectors to said second connectors and engaging said first connectors with said second connectors,
wherein each of said first and second plurality of connectors include one of a boss and a rotatable lever, each corresponding opposed connector having the complementary other of said boss and said rotatable lever, whereby when said first plurality of connectors are pushed into said second plurality of connectors each boss engages an engagement groove of a corresponding said rotatable lever and each rotatable lever automatically rotates to draw said first plurality of connectors toward said second plurality of connectors with a force larger than the pushing force applied to said first plurality of connectors.

2. A steering unit-mounting apparatus comprising:
a steering unit having a combination switch and a first plurality of connectors connected to the combination switch;
a steering post having a steering shaft and a second plurality of connectors fixable thereon and symmetrically located about said steering shaft;
said steering unit is mountable on said steering post in a provisionally mounted position; and
said first plurality of connectors each oppose and engage a corresponding one of said second plurality of connectors to act as jigs for positioning and provisionally fixing said steering unit to said steering post,
wherein each of said first and second plurality of connectors include one of a boss and a rotatable lever and each corresponding opposed connector has a the complementary other of said boss and said rotatable lever, whereby when said first plurality of connectors are pushed into said second plurality of connectors each boss engages an engagement groove of a corresponding said rotatable lever and said rotatable lever automatically rotates to draw said first plurality of connectors toward said second plurality of connectors with a force larger than the pushing force applied to said first plurality of connectors.

3. A steering unit-mounting apparatus comprising:
a steering unit having a combination switch and a first plurality of connectors connected to the combination switch;
a steering post having a steering shaft and a second plurality of connectors fixable thereon and symmetrically located about said steering shaft, said second connectors being engagable with said first connectors in an connected position,
wherein said steering unit is mountable on said steering post in a provisionally aligned and mounted position by aligning and opposing said first connectors to said second connectors and engaging said first connectors with said second connectors,
wherein said first connectors includes a male thread and said second connectors includes a female thread for engagement with the male thread of said first connectors to draw said first connectors to said second connectors.

4. A steering unit-mounting apparatus comprising:
a steering unit having a combination switch and a first plurality of connectors connected to the combination switch;
a steering post having a steering shaft and a second plurality of connectors fixable thereon and symmetrically located about said steering shaft;
said steering unit is mountable on said steering post in a provisionally mounted position; and
said first plurality of connectors each oppose and engage a corresponding one of said second connectors to act as jigs for positioning and provisionally fixing said steering unit to said steering post,
wherein said first connectors includes a male thread and said second connectors includes a female thread for engagement with the male thread of said first connectors to draw said first connectors to said second connectors.

5. A steering unit-mounted apparatus comprising:
a combination switch;
a first plurality of connectors connected to said combination switch, said first connectors including a male thread; and a steering unit including a through hole for mating with a steering post, said combination switch and said first plurality of connectors, wherein:

said first plurality of connectors are symmetrically arranged about said through hole and arranged to oppose a corresponding second plurality of connectors provided on the steering post, the second connectors including a female thread matable with said male thread of said first connectors; and when said steering unit is to be mounted on the steering post, said steering unit is positioned and provisionally fixed relative to said steering post by aligning and connecting said first connectors to said second connectors by threading of said male thread of said first connectors onto the female thread of the second connectors.

* * * * *